(12) United States Patent
Span et al.

(10) Patent No.: US 7,784,804 B2
(45) Date of Patent: Aug. 31, 2010

(54) STEERING GEAR

(75) Inventors: Eduard Span, Cologne (DE); Markus Beiss, Eschweiler (DE); Thomas Klein, Meerbusch (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 11/920,586

(22) PCT Filed: Mar. 27, 2006

(86) PCT No.: PCT/EP2006/002781
§ 371 (c)(1),
(2), (4) Date: Jan. 14, 2009

(87) PCT Pub. No.: WO2006/122603
PCT Pub. Date: Nov. 23, 2006

(65) Prior Publication Data
US 2009/0166994 A1    Jul. 2, 2009

(30) Foreign Application Priority Data
May 20, 2005   (DE) ............... 20 2005 007 923

(51) Int. Cl.
*B62D 3/12*    (2006.01)
(52) U.S. Cl. .................. 280/93.514; 280/93.515; 180/427; 180/428; 74/422
(58) Field of Classification Search ............ 280/93.514, 280/93.515; 180/427, 428; 74/492, 493, 74/422, 496–500
See application file for complete search history.

(56) References Cited

U.S. PATENT DOCUMENTS

| 3,834,727 | A | | 9/1974 | Adams |
| 4,218,933 | A | * | 8/1980 | Allen et al. .................... 74/422 |
| 5,216,928 | A | * | 6/1993 | Kodachi ....................... 74/422 |
| 6,330,929 | B1 | * | 12/2001 | Gierc et al. ................. 180/428 |
| 6,427,552 | B1 | * | 8/2002 | Sahr ............................ 74/422 |
| 6,435,050 | B1 | | 8/2002 | Tanke, II et al. |
| 6,568,698 | B2 | * | 5/2003 | Kojima .................. 280/93.514 |
| 7,401,789 | B2 | * | 7/2008 | Harer et al. ................. 277/585 |
| 2006/0108759 | A1 | * | 5/2006 | Nishiko ................. 280/93.514 |

FOREIGN PATENT DOCUMENTS

| DE | 1 680 320 | | 9/1971 |
| DE | 22 14 577 | | 10/1972 |
| EP | 0 507 164 A2 | | 10/1992 |
| EP | 1 386 822 A2 | | 2/2004 |
| GB | 1 214 032 | | 11/1970 |
| JP | 59-192670 | | 11/1984 |
| JP | 59192670 | * | 11/1984 |
| JP | 9-207796 | | 8/1997 |
| JP | 09207796 | * | 8/1997 |
| JP | 2004-232788 | | 8/2004 |
| JP | 2004232788 | * | 8/2004 |

* cited by examiner

*Primary Examiner*—Paul N Dickson
*Assistant Examiner*—Laura Freedman
(74) *Attorney, Agent, or Firm*—MacMillan, Sobanski & Todd, LLC

(57) ABSTRACT

A steering gear for a rack and pinion steering system, including a housing in which a steering rack is guided for displacement along its axis, has an auxiliary support which is located at an axial end of the housing, the auxiliary support limiting a bending of the steering rack.

7 Claims, 3 Drawing Sheets

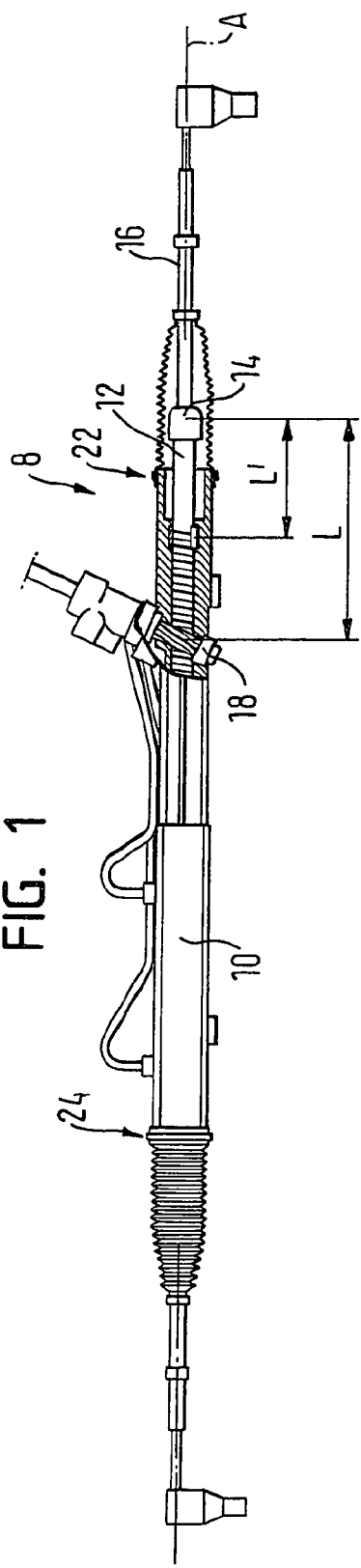
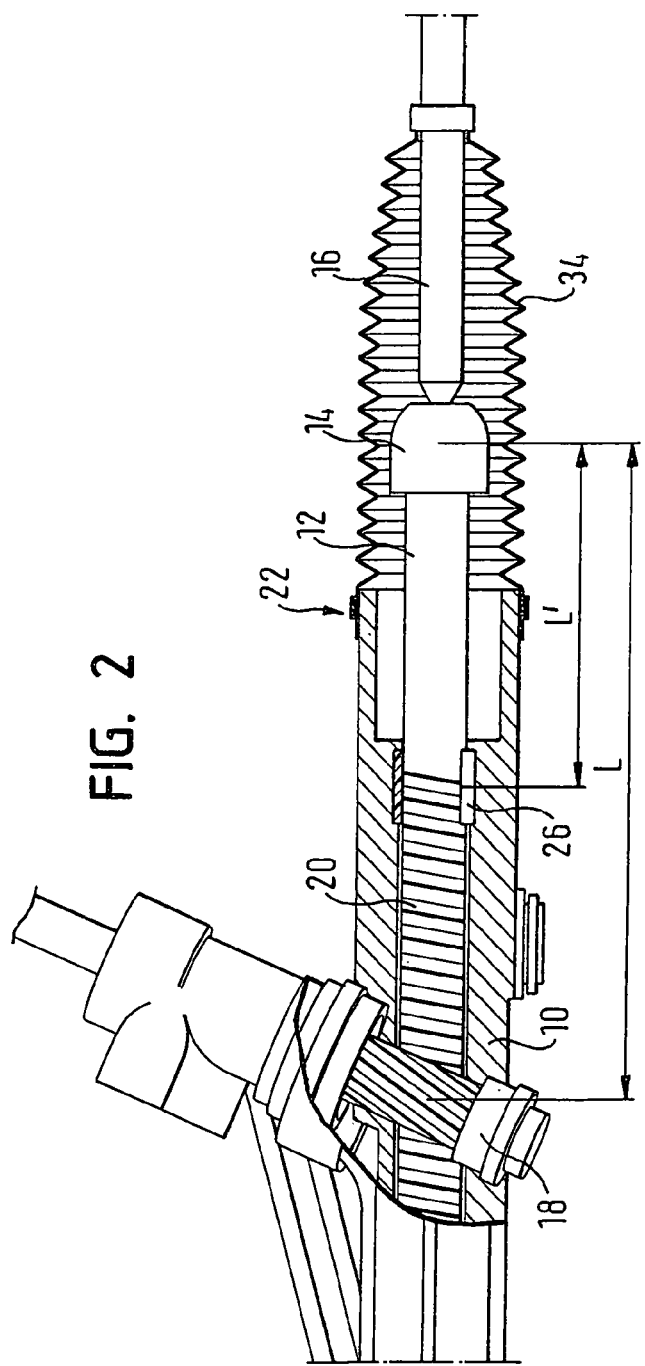
FIG. 1
FIG. 2

STEERING GEAR

CROSS-REFERENCE TO RELATED APPLICATIONS

This application is a National Stage of International Application No. PCT/EP2006/002781 filed Mar. 27, 2006, the disclosures of which are incorporated herein by reference in entirety, and which claimed priority to German Patent Application No. 20 2005 007 923.5 filed May 20, 2005, the disclosures of which are incorporated herein by reference in entirety.

BACKGROUND OF THE INVENTION

The invention relates to a steering gear for a rack and pinion steering system.

Nowadays, rack and pinion steering gears are used almost exclusively in vehicle steering systems, in particular in cars. These steering gears comprise a steering rack which is guided for displacement in a housing along its axis, and a pinion which meshes with a serrated section of the steering rack and is connected to a steering wheel by means of a steering rod. The two axial ends of the steering rack project from the housing and are each joined to a tie rod by a ball joint, the tie rod being coupled with a vehicle wheel.

Viewed in the direction of the steering rack, the pinion is generally located closer to one end of the housing than to the other end. The axially displaceable mounting and guiding of the steering rack is generally implemented at two points in the housing, one of them at the end of the housing remote from the pinion, and the other directly at the point of contact of the pinion where a pressure piece acts upon the steering rack in the direction of the pinion. By means of this two-point mounting, the steering rack is mounted in a statically determinate manner, and this contributes to the lightness of steering; any further mounting position would lead to a static over-determination, and so possibly to tensions.

One problem with this arrangement is the relatively large distance between the mounting position on the pinion and the point of contact of the tie rod at the end of the steering rack near to the pinion. Because the force which is introduced into the tie rod or from the tie rod into the steering rack, generally also has a component which does not run in the longitudinal direction of the steering rack, this leads to a bending load which acts on the steering rack.

An extreme bending load applied to the steering rack occurs, for example if, when the steering is operated, the tire is blocked in its steering movement (e.g. by a curb). The dimensioning of the steering rack is significantly affected by this type of extreme case of bending load.

BRIEF SUMMARY OF THE INVENTION

It is a feature of this invention to limit the bending of the steering rack.

In order to achieve this feature, the invention provides a steering gear for a rack and pinion steering system, comprising a housing in which a steering rack is guided for displacement along its axis, and an auxiliary support which is located at an axial end of the housing, the auxiliary support limiting a bending of the steering rack. This offers the advantage that a steering rack having a smaller diameter can be used, and so on the one hand the weight, and on the other hand the cost of the steering gear are reduced. It should be emphasized here that, despite the auxiliary support, tensions rising from statically over-determinate mounting do not play a role because the steering rack remains mounted in a largely statically determinate manner. Indeed, the auxiliary support is not a permanent mounting, but only offers a temporary support in the case of extreme bending loads. The mounting of the steering rack is therefore only statically over-determinate during the short period of extreme loading. Moreover, the auxiliary support makes it possible to use smaller serrated modules (and so a smaller serration height). This increases the cross-section of the steering rack and offers advantages with regard to the design of the serrations.

In one embodiment, the housing has an indentation in which the auxiliary support is mounted. The auxiliary support is thus fixed in place in the longitudinal direction of the steering rack without using any additional attachment means.

In another embodiment, the auxiliary support has a radial protrusion which extends in the longitudinal direction of the steering rack and runs in a groove of the housing. Due to this protrusion, it is no longer possible to rotate the auxiliary support about the steering rack axis relative to the housing.

Preferably, the auxiliary support has a cut-out which is located opposite a serrated section of the steering rack. Due to this, a direct contact of the auxiliary support with the serrated area of the steering rack is not possible so that the auxiliary support and the serrated section can not create any undesired connection which impedes movement of the steering rack along its axis.

Preferably, the auxiliary support is a clip with a C-shaped cross-section. This type of clip is easy to produce and can be fitted quickly and easily on the housing.

Furthermore, it is possible to make the auxiliary support from a synthetic material. The auxiliary support is thus particularly inexpensive, and due to the synthetic composition, it is easy to optimize with regard to elasticity and slide properties.

In a preferred embodiment, a pinion is provided which meshes with a serrated section of the steering rack, the pinion, viewed in the direction of the steering rack, being located closer to a first end than to a second end of the housing, and the auxiliary support being only provided at the first end. The maximum bending load of the steering rack generally occurs in the area of the first end of the housing, because at the second end of the housing a true mounting point for the steering rack is generally already provided.

Other advantages of this invention will become apparent to those skilled in the art from the following detailed description of the preferred embodiments, when read in light of the accompanying drawings.

BRIEF DESCRIPTION OF THE DRAWINGS

FIG. 1 shows a side view, partially as an open section, of a steering gear in accordance with the invention;

FIG. 2 shows a detailed section from FIG. 1;

DETAILED DESCRIPTION OF THE INVENTION

Figure 3:
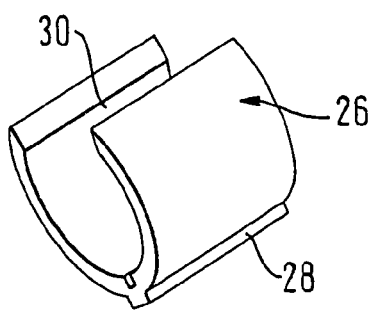
FIG. 3 shows a perspective view of an auxiliary support.

FIG. 1 shows a steering gear 8 for a rack and pinion steering system, comprising a housing 10 in which a steering rack 12 is guided for displacement along its axis A. The steering rack 12 projects out of the housing 10 at its axial ends, and is respectively connected to a tie rod 16 by means of a ball joint 14. The tie rod 16, in turn, is coupled with a vehicle wheel (not shown) such that it can bring about a steering movement of the vehicle wheel.

Furthermore, a pinion 18 can be seen in FIG. 1, which meshes with a serrated section 20 of the steering rack 12. Observed in the direction of the steering rack 12, the pinion 18 is located closer to a first end 22 than to a second end 24 of the housing 10.

The area around the first end 22 of the housing 10 is shown in detail in FIG. 2. An auxiliary support 26 is provided between the ball joint 14 and the pinion 18 and limits a bending of the steering rack 12. The distance between the point of contact of the pinion 18 on the steering rack 12 and the ball joint 14 is indicated here by L, and the distance between the auxiliary support 26 and the ball joint 14 by L'.

A preferred embodiment of the auxiliary support 26 is shown in FIG. 3. The auxiliary support 26 here has a radial protrusion 28 which extends in the axial direction in installed state. On the side of the auxiliary support 26 opposite the protrusion 28, a cut-out 30 is provided so that the auxiliary support 26 is a clip with an essentially C-shaped cross-section. Preferably, the clip is made from a synthetic material, and this synthetic should have a certain degree of elasticity for fitting. Furthermore, good slide properties are beneficial for a case where the clip touches the steering rack 12.

Figure 4:
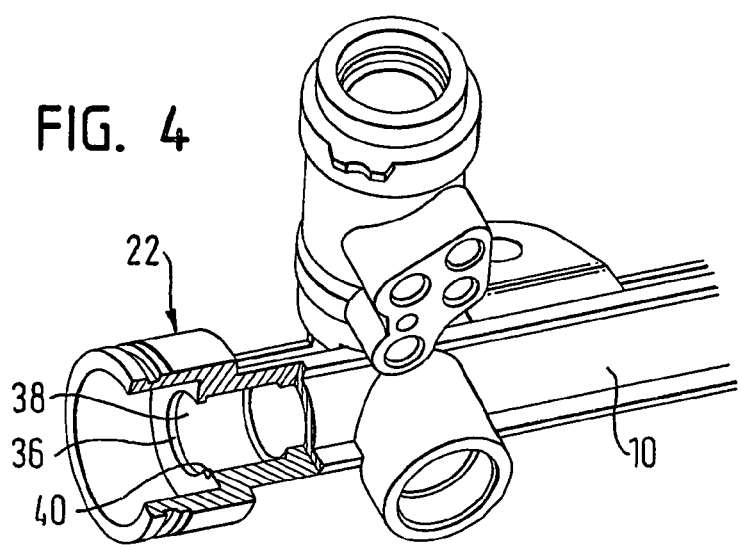
FIG. 4 shows a perspective view, partially as an open section, of an end portion of the housing.

The auxiliary support 26 is fitted on an axial end of the housing 10. FIG. 4 shows a section of the housing 10 in the area of the first end 22, the outer section 32 of the first end 22 being provided as a connection element for a bellows 34 (see FIG. 2). Directly on the first end 22, a narrow edge 36 can be seen on the inside of the housing, which is adjoined by an indentation 38 in the axial direction. The narrow edge 36 prevents the auxiliary support 26 from "sliding out" in fitted state. In the indentation 38, an axially oriented groove 40 is provided which also extends over the edge 36.

When fitting, the auxiliary support 26 is slightly pressed together so that the cut-out 30 decreases in size. In this pressed together state, the auxiliary support 26 can be pushed over the edge 36 in the axial direction into the housing 10. The auxiliary support 26 is aligned here such that the protrusion 28 is guided in the groove 40. When the auxiliary support has been fully pushed over the edge 36, its elasticity causes it to snap into the indentation 38; the axial dimensions of the indentation 38 and the auxiliary support 26 are chosen such that the auxiliary support 26 is fixed in its axial position. The protrusion 28 cooperates with the groove 40 so that any rotation of the auxiliary support 26 about the axis A relative to the housing 10 is prevented.

Figure 5:
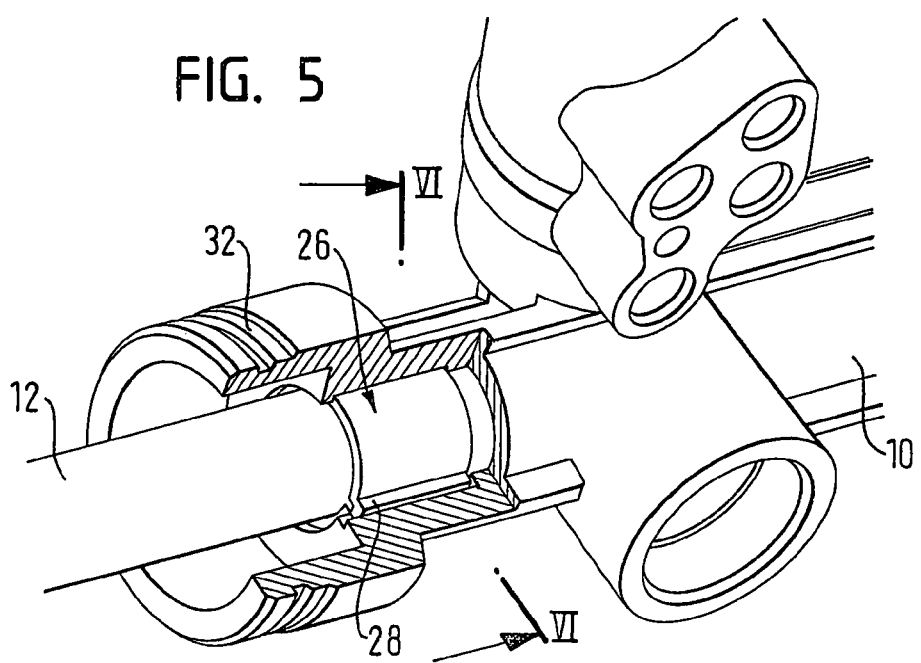
FIG. 5 shows a perspective view, partially as an open section, of the end portion of the housing from FIG. 4, with the auxiliary support fitted.
Figure 6:
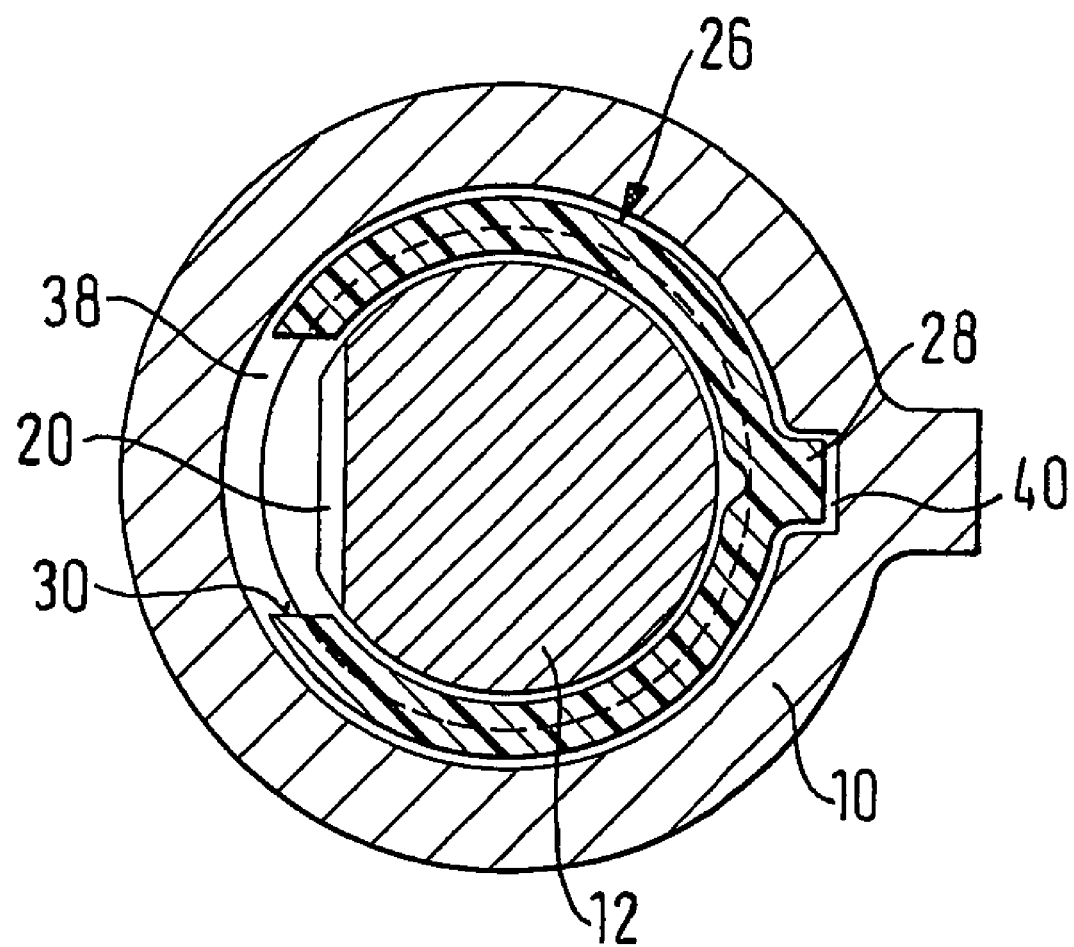
FIG. 6 shows a cross-section along line VI-VI in FIG. 5.

FIGS. 5 and 6 show a view, partially as an open section, and a cross-section in the area of the fitted auxiliary support 26. In the section, it can clearly be seen that the cut-out 30 is adjacent to the serrated section 20 of the steering rack 12. In this way it is ensured that the auxiliary support 26 can not under any circumstances come into contact with the serrated section 20 so as to prevent the serrated section 20 from causing any damage to the auxiliary support 26.

Apart from the section with the cut-out 30, the auxiliary support 26 surrounds the steering rack 12; when no load is applied to the steering rack, the auxiliary support 26 is not in contact with the steering rack 12, but has a circumferential play of at least 2 tenths of a millimeter. Because of this circumferential, radial gap, the auxiliary support 26 is not an additional, permanent mounting or guide, so that the steering rack 12 is still mounted in a statically determinate manner. For a case where bending of the steering rack 12 in the area of the auxiliary support 26 exceeds this gap size, the steering rack 12 comes in contact with the auxiliary support 26 which reduces any further bending of the steering rack 12.

The bending load of the steering rack 12 results from the fact that not only normal forces, but also transverse forces are transferred by the ball joint 14. By means of the transverse force occurring on the ball joint 14 and the lever arm L, a moment M occurs in the steering rack in the mounting point where the pinion 18 makes contact. With small transverse forces which only cause bending of the steering rack 12 of a few tenths of a millimeter, this static system continues to be maintained.

With any greater transverse forces that occur, the auxiliary support 26, however, develops into a temporary support point of the steering rack 12. As a result of this additional support point, the lever arm is reduced to L', and this causes the steering rack to be subjected to a smaller bending moment. In order to achieve the greatest possible reduction of the bending moment in the steering rack, the auxiliary support 26 should preferably be located as close as possible to the first end 22 of the housing 10.

The steering rack 12 can then be designed with a smaller diameter due to the smaller bending load. The weight of the steering rack thus decreases, and consequently also the production costs thereof.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering gear for a rack and pinion steering system, comprising a housing in which a steering rack is guided for displacement along an axis thereof, and an auxiliary support which is located at an axial end of the housing, the auxiliary support limiting a bending of the steering rack, wherein the auxiliary support is not in contact with any portion of the steering rack when no load is applied to the steering rack.

2. The steering gear according to claim 1, wherein the housing has an indentation in which the auxiliary support is mounted.

3. The steering gear according to claim 1, wherein the auxiliary support has a radial protrusion which extends in the longitudinal direction of the steering rack and runs in a groove of the housing.

4. The steering gear according to claim 1, wherein the auxiliary support has a cut-out located opposite a serrated section of the steering rack.

5. The steering gear according to claim 1, wherein the auxiliary support is a clip with an essentially C-shaped cross-section.

6. The steering gear according to claim 1, wherein the auxiliary support is made from a synthetic material.

7. The steering gear according to claim 1, wherein a pinion is provided which meshes with a serrated section of the steering rack, the pinion, as viewed in the direction of the steering rack, being located closer to a first end than to a second end of the housing, and the auxiliary support being only provided at the first end.

* * * * *